No. 818,568. PATENTED APR. 24, 1906.
E. B. SIMS.
TIRE FOR VEHICLES.
APPLICATION FILED JUNE 27, 1905.

Witnesses:
Dora M. Sims
Mabel E. Thompson

Inventor:
Edward B. Sims

UNITED STATES PATENT OFFICE.

EDWARD B. SIMS, OF WESTERN, NEBRASKA.

TIRE FOR VEHICLES.

No. 818,568.  Specification of Letters Patent.  Patented April 24, 1906.

Application filed June 27, 1905. Serial No. 267,308.

*To all whom it may concern:*

Be it known that I, EDWARD B. SIMS, a citizen of the United States, residing at Western, in the county of Saline and State of Nebraska, have invented a new and useful Tire for Vehicles of Conveyance, of which the following is a specification.

My invention relates to improvements in tires.

The object of this tire is to destroy concussion produced by a wheel passing over ordinary obstructions. I attain this object by the mechanism illustrated in the accompanying drawings, in which—

Figure 1:
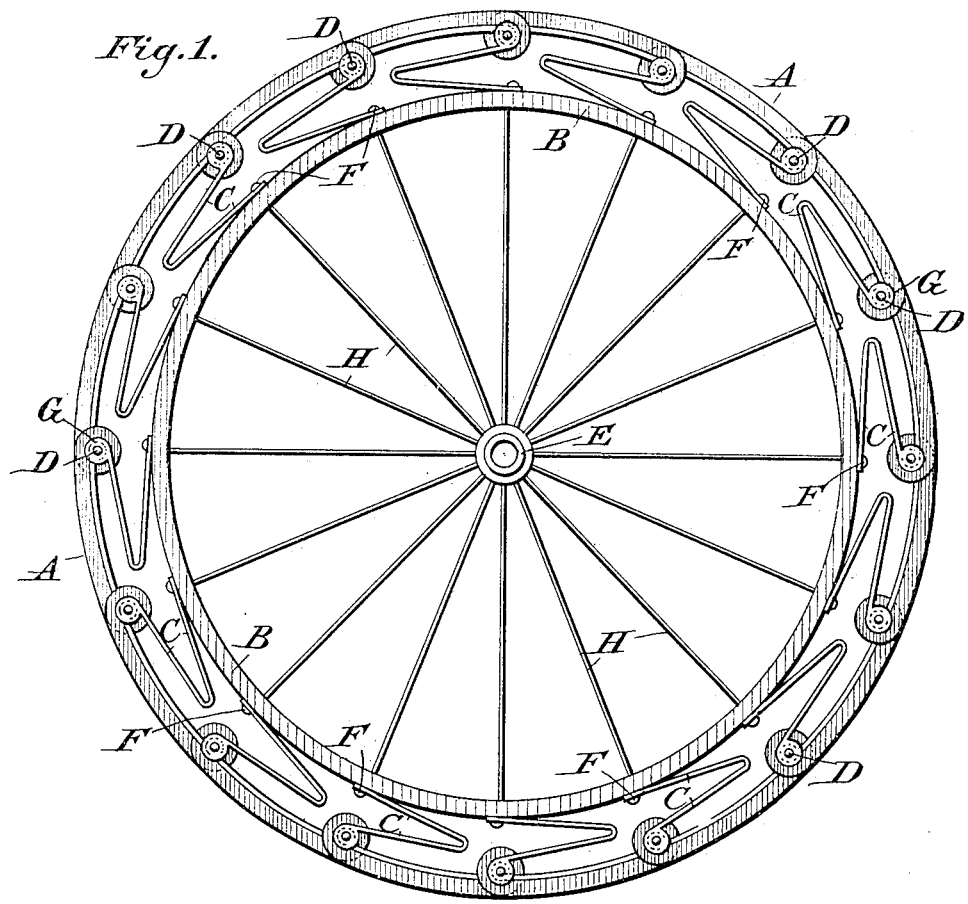
Figure 2:
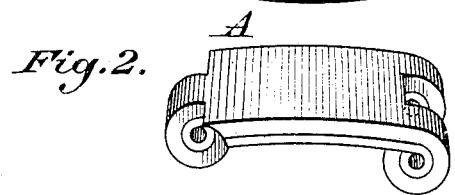
Figure 3:
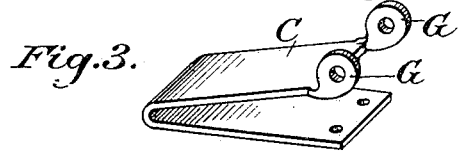
Figure 4:
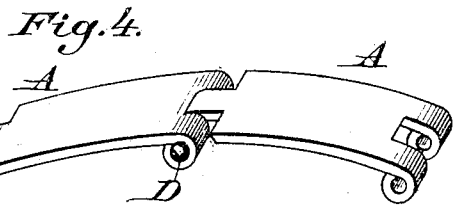

Figure 1 is a side view of the entire tire as it appears when attached to a wheel. Fig. 2 is a perspective view of a single section of tire, showing rubber pads. Fig. 3 is a perspective view of a spring connecting tire to rim. Fig. 4 is a perspective view of two sections of tire as they appear without rubber pads.

Similar letters refer to similar parts throughout the several views.

Fig. 1, the hub E, the spokes H H H, the tire B, compose the common wheel. On the outside of the common tire B another tire A, parallel with common tire B, is attached by succession of springs C C C. The outer tire A is composed of metal sections covered with rubber pads, as shown in Fig. 2, held together by hinged joints and rivets D D D in such manner as to form a complete tire. Between these two tires A and B is a succession of springs C C C, fastened securely to the rim of inner tire B at F F F and secured to the outer tire A by the rivets D D D passing through the eyelets G G, as shown in Fig. 3.

What I claim as my invention, and desire to secure by Letters Patent, is—

A tire composed of metal sections hinged together, connected to the rim of a common wheel by a succession of springs, each section being covered by a separate rubber pad.

In testimony whereof I have signed my name to this specification in the presence of two subscribing witnesses.

EDWARD B. SIMS.

Witnesses:
 J. L. BROWN,
 S. M. BROWN.